(12) United States Patent
Romandy et al.

(10) Patent No.: US 12,507,829 B2
(45) Date of Patent: Dec. 30, 2025

(54) COFFEE GRINDER WITH SELECTABLE GRINDING PARAMETERS

(71) Applicant: Hamilton Beach Brands, Inc., Glen Allen, VA (US)

(72) Inventors: Mark Romandy, Glen Allen, VA (US); Paul Diaz, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 278 days.

(21) Appl. No.: 18/238,224

(22) Filed: Aug. 25, 2023

(65) Prior Publication Data

US 2025/0064263 A1 Feb. 27, 2025

(51) Int. Cl.
| | |
|---|---|
| *A47J 42/46* | (2006.01) |
| *A47J 42/26* | (2006.01) |
| *A47J 42/28* | (2006.01) |
| *A47J 42/32* | (2006.01) |
| *A47J 42/36* | (2006.01) |
| *A47J 42/50* | (2006.01) |
| *A47J 42/56* | (2006.01) |

(52) U.S. Cl.
CPC ............... *A47J 42/46* (2013.01); *A47J 42/26* (2013.01); *A47J 42/28* (2013.01); *A47J 42/56* (2013.01)

(58) Field of Classification Search
CPC .. A47J 42/40; A47J 42/46; A47J 42/26; A47J 42/28; A47J 42/56; A47J 42/32; A47J 42/36; A47J 42/50
See application file for complete search history.

(56) References Cited

U.S. PATENT DOCUMENTS

| | | | |
|---|---|---|---|
| 10,343,175 B1 * | 7/2019 | Abehasera | B02C 18/12 |
| 2003/0205635 A1 * | 11/2003 | Lazzer | A47J 43/0777 241/37.5 |
| 2018/0055288 A1 * | 3/2018 | Rose | A47J 42/40 |

* cited by examiner

*Primary Examiner* — Mohammed S. Alawadi
(74) *Attorney, Agent, or Firm* — Alexander D. Raring

(57) ABSTRACT

A grinding device includes: a housing that includes a sidewall; a grinding bowl within the housing; a cover that mates with one of the housing and the grinding bowl, wherein the cover together with the grinding bowl defines a grinding chamber; a blade positioned within the grinding chamber; a motor, positioned within the housing, operatively connected with and configured to rotate the blade; and a dial generally radially aligned with the sidewall of the housing, wherein the dial is configured to control at least one operational parameter of the motor; and wherein the dial rotates around a substantially vertical axis.

12 Claims, 11 Drawing Sheets

COFFEE GRINDER WITH SELECTABLE GRINDING PARAMETERS

FIELD OF THE INVENTION

The present invention relates generally to small kitchen appliances and, in particular, to coffee bean grinding devices.

BACKGROUND OF THE INVENTION

Coffee bean grinding devices are used to grind whole coffee beans into a powder (i.e., grounds) of varying degrees of coarseness. Generally, coffee beans are placed into the blade chamber of the coffee bean grinding device, the rotation of the blades about the center of the chamber reduces the beans to grounds. The duration of the grinding and speed of the blades have the largest impact on the final coarseness of the coffee grounds.

It may be desirable to provide additional configurations for coffee bean grinding devices, particularly in a manner that users can easily use to produce grounds in a desired amount and/or of a desired coarseness.

SUMMARY

As a first aspect, embodiments of the invention are directed to a grinding device comprising: a housing that includes a sidewall; a grinding bowl within the housing; a cover that mates with one of the housing and the grinding bowl, wherein the cover together with the grinding bowl defines a grinding chamber; a blade positioned within the grinding chamber; a motor, positioned within the housing, operatively connected with and configured to rotate the blade; and a dial generally radially aligned with the sidewall of the housing. The dial is configured to control at least one operational parameter of the motor and rotates around a substantially vertical axis.

As a second aspect, embodiments of the invention are directed to a grinding device comprising: a housing that includes a sidewall; a base below the sidewall; a grinding bowl within the housing; a cover that mates with one of the housing and the grinding bowl, wherein the cover together with the grinding bowl defines a grinding chamber; a blade positioned within the grinding chamber; and a motor, positioned within the housing, operatively connected with and configured to rotate the blade. At least the grinding chamber defines a moveable unit configured to move vertically between (a) a depressed position, in which the moveable unit is closer to the base of the housing, and (b) a raised position, in which the moveable unit is farther from the base of the housing.

DETAILED DESCRIPTION OF EMBODIMENTS OF THE INVENTION

Figure 1:
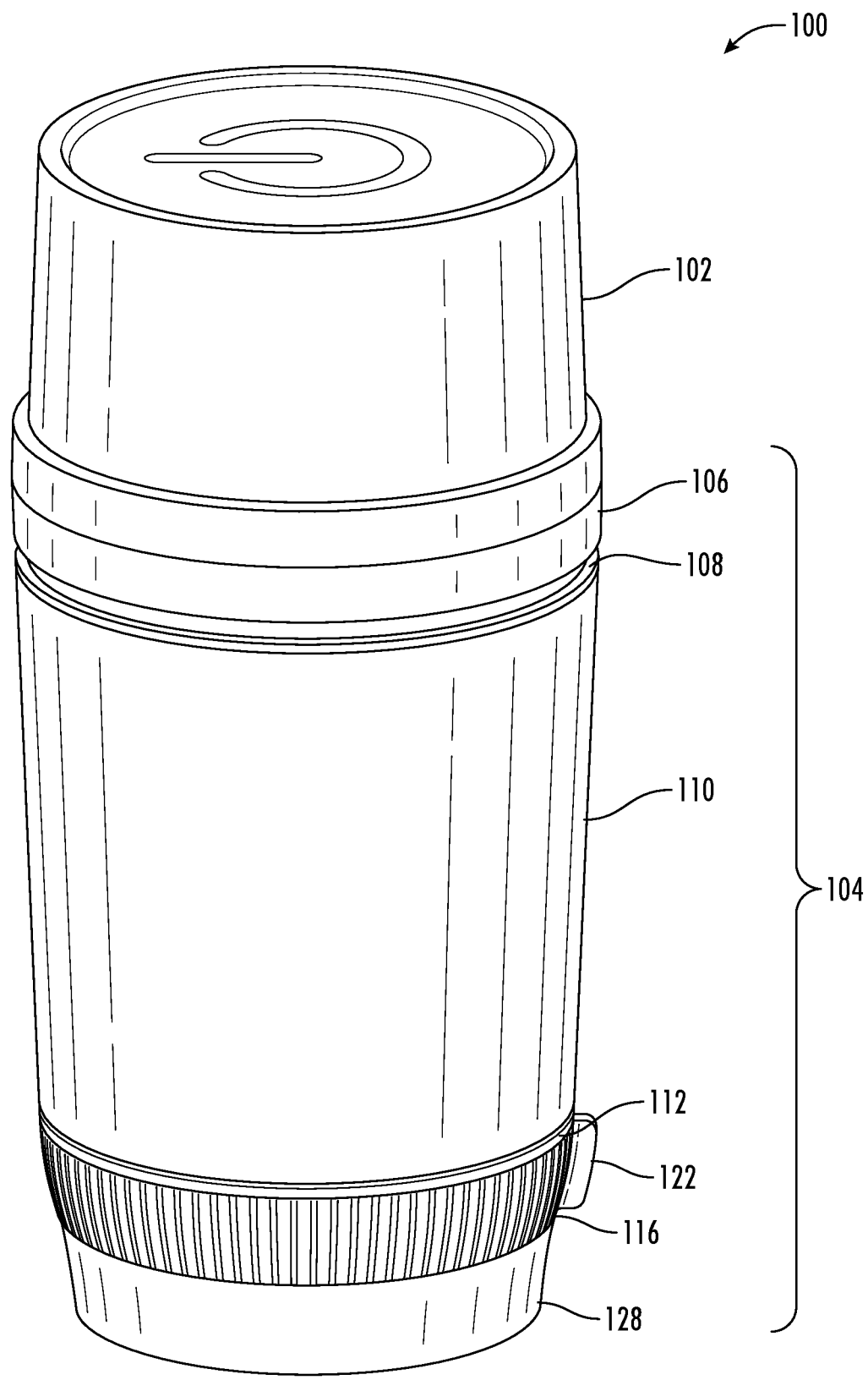
FIG. 1 is a perspective side view of a grinding device according to one embodiment of the invention.

The present invention is described more fully hereinafter with reference to the accompanying figures, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Like numbers refer to like elements throughout and different embodiments of like elements can be designated using a different number of superscript indicator apostrophes (e.g., 10, 10', 10"). In the figures, the size of certain lines, layers, components, elements or features may be exaggerated for clarity. Additionally, broken lines illustrate optional features or operations unless specified otherwise.

The terminology used herein is for the purpose of describing particular embodiments only and is not intended to be limiting of the invention. Unless otherwise defined, all terms used herein, including technical and scientific terms, have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention. The sequence of operations (or steps) is not limited to the order presented in the claims or figures unless specifically indicated otherwise.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element (e.g., a device, circuit, etc.) is referred to as being "on," "attached" to, "connected" to, "coupled" with, "contacting," etc., another element, it can be directly on, attached to, connected to, coupled with, or contacting the other element or intervening elements may also be present. In contrast, when an element is referred to as being, for example, "directly on," "directly attached" to, "directly connected" to, "directly coupled" with, or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper," "lateral," "left," "right," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, as used herein, the terms "example," "exemplary," and derivatives thereof are intended to refer to non-limiting examples and/or variants embodiments discussed herein and are not intended to indicate preference for one or more embodiments discussed herein compared to one or more other embodiments.

Figure 2:
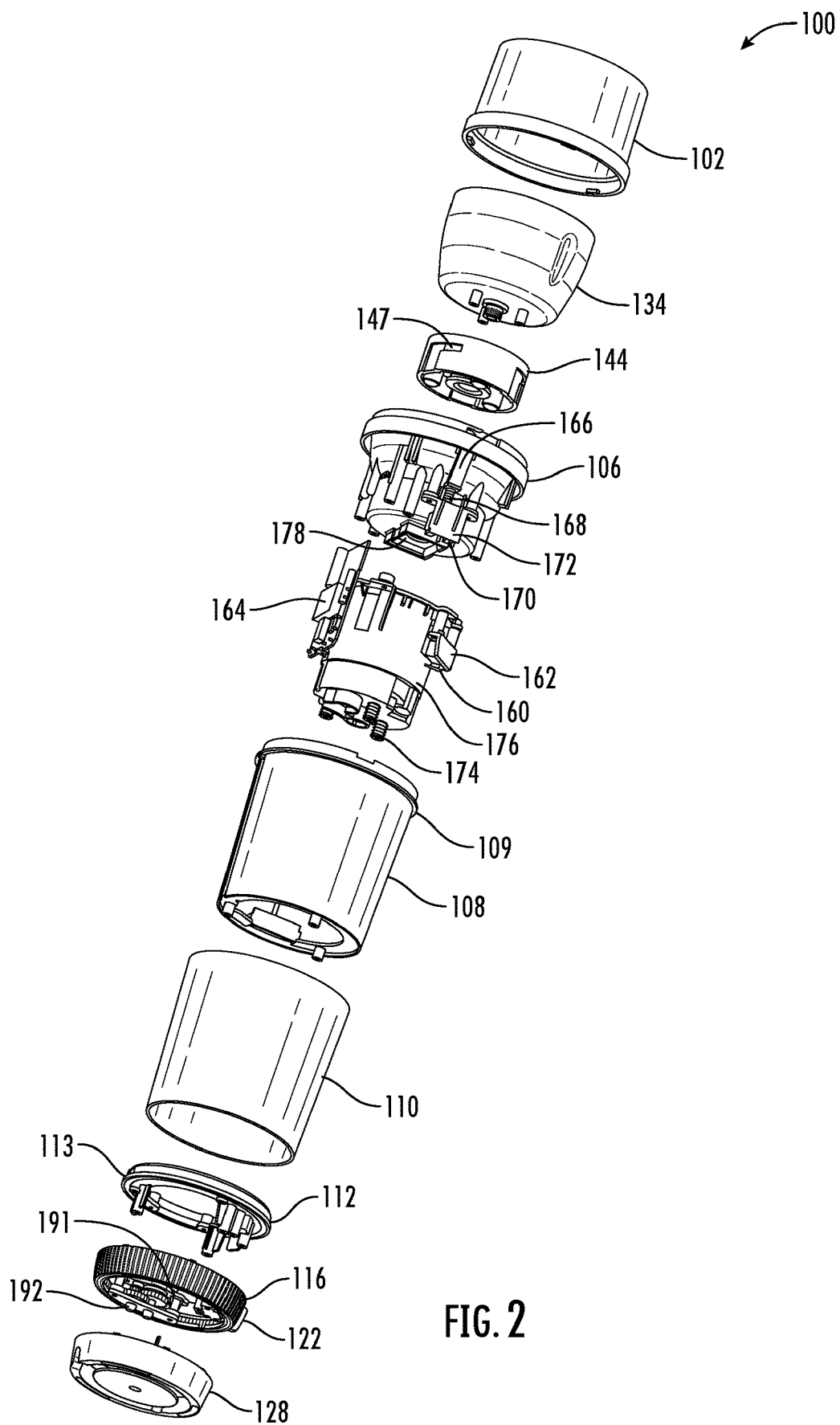
FIG. 2 is an exploded perspective view of the grinding device according to FIG. 1.

Referring now to the figures, one embodiment of a grinding device is illustrated in FIGS. 1 and 2 designated broadly at 100. The exterior of the grinding device 100 includes a cover 102 and a housing 104. The housing 104 comprises a grinding bowl housing 106, an inner shell 108, an outer shell 110, an upper dial support 112, a dial 116, and a base 128. The sidewall of the housing 104 primarily comprises the inner shell 108 and the outer shell 110. The housing 104 may be configured with indicia (not shown) to indicate the operational parameter setting position in which the dial 116 resides. These indicia may indicate a desired result (e.g., the desired level of ground coarseness and/or for the quantity of coffee beans being ground).

As can be seen in FIG. 1, each of the cover 102, the grinding bowl housing 106, the inner shell 108, the outer shell 110, the upper dial support 112, and the base 128 is generally cylindrical about the vertical axis A of the device and provide generally smooth exterior surface to the housing 104. The dial 116 is generally radially aligned with the inner shell 108 and outer shell 110 (i.e., the sidewall) of the housing 104 and generally cylindrical about the vertical axis A with a ridged exterior surface to provide additional grip to users when they rotate the dial 116. Additionally, the dial 116 has a tab 122 which functions to provide users with an additional method of operating the dial 116 and, in some embodiments, to indicate the operational parameter setting position.

Figure 4:
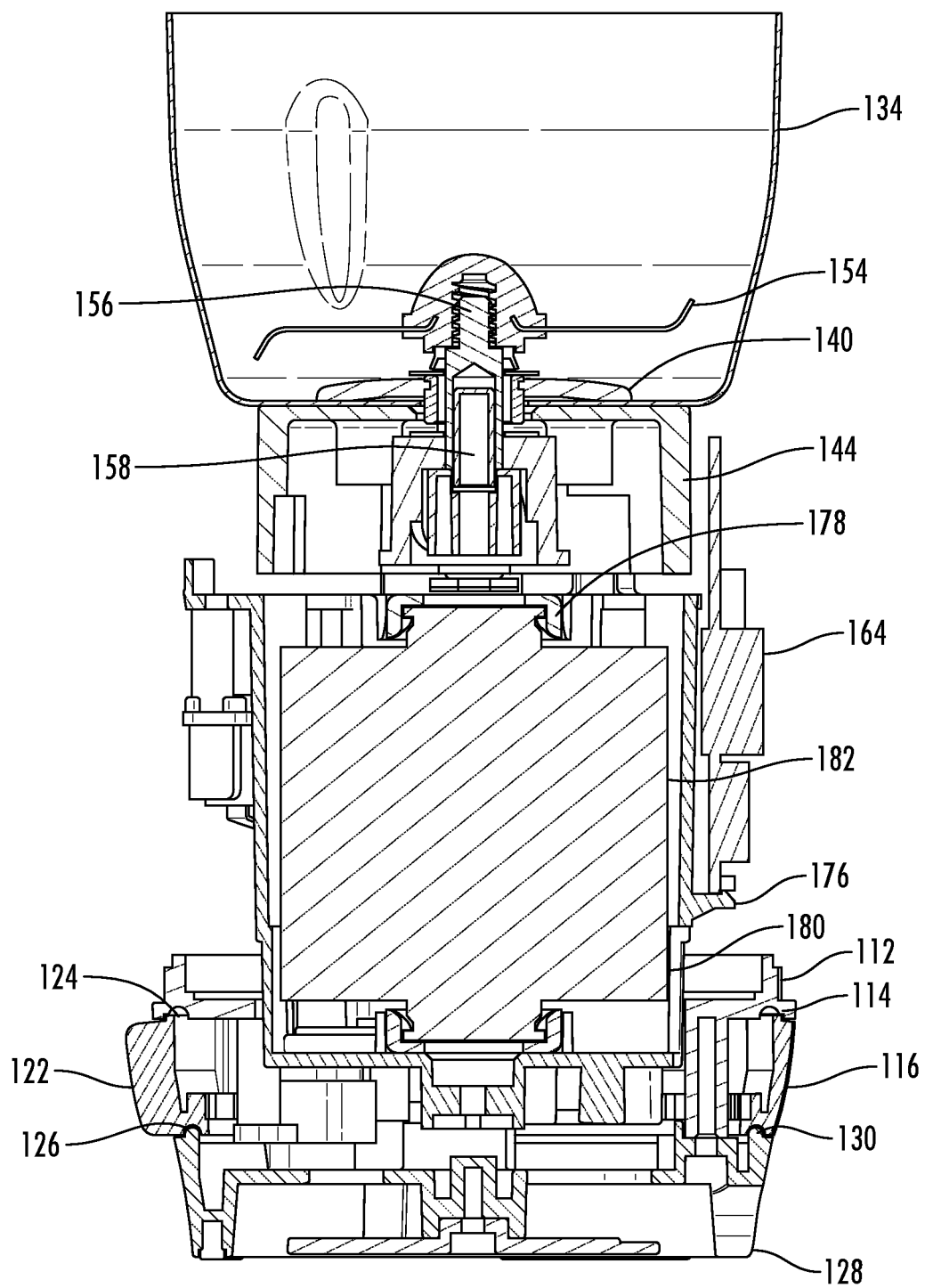
FIG. 4 is a side section view of the grinding device according to FIG. 3 wherein the device is rotated 90 degrees along its vertical axis.

As can be seen in FIG. 4, the upper dial support 112 and the base 128 are connected internally through the hollow center of the dial 116. The dial 116 is captured between the upper dial support 112 and the base 128, thereby preventing the dial 116 from separating from the remainder of the housing 104; however, the dial 116 is configured to rotate about the vertical axis A (shown in FIG. 10) relative to the remainder of the housing 104. The upper dial support 112 has a circular groove 114 on its bottom side which mates with a circular ridge 124 on the top side of the dial 116. Similarly, the dial 116 has a circular groove 126 on its bottom side which mates with a circular ridge 130 on the top side of the base 128. Because the dial 116 is connected to the remainder of the housing 104 in this manner, the dial 116 can rotate relative to the remainder of the housing 104 while still being operatively connected to the remainder of the housing 104.

The upper dial support 112 is connected to the bottom of the inner shell 108. The exterior surface of the inner shell 108 mates with the interior surface of the outer shell 110. A short ridge (not shown) extends vertically along the interior surface of the outer shell 110 and mates with a shallow groove (not shown) which extends vertically along the exterior surface of the inner shell 108. This engagement prevents the outer shell 110 from rotating relative to the inner shell 108.

A circular inner shell lip 109 extends around the upper edge of the inner shell 108 and radially outwardly. This configuration prevents the outer shell 110 from moving upwardly relative to the inner shell 108. Similarly, a circular upper dial support lip 113 extends around the upper edge of the upper dial support 112 and radially outwardly. This configuration prevents the outer shell 110 from moving downward in relation to the inner shell 108.

The grinding bowl housing 106 is generally cylindrical about the vertical axis A. It mates with, and is contained partially within, the inner shell 108. The cover 102 mates with the grinding bowl housing 106 and together with a grinding bowl 134 (which is positioned within the grinding bowl housing 106) defines a grinding chamber 132 (see FIG. 6). In some embodiments the cover 102 is made of a clear material.

Figure 5:
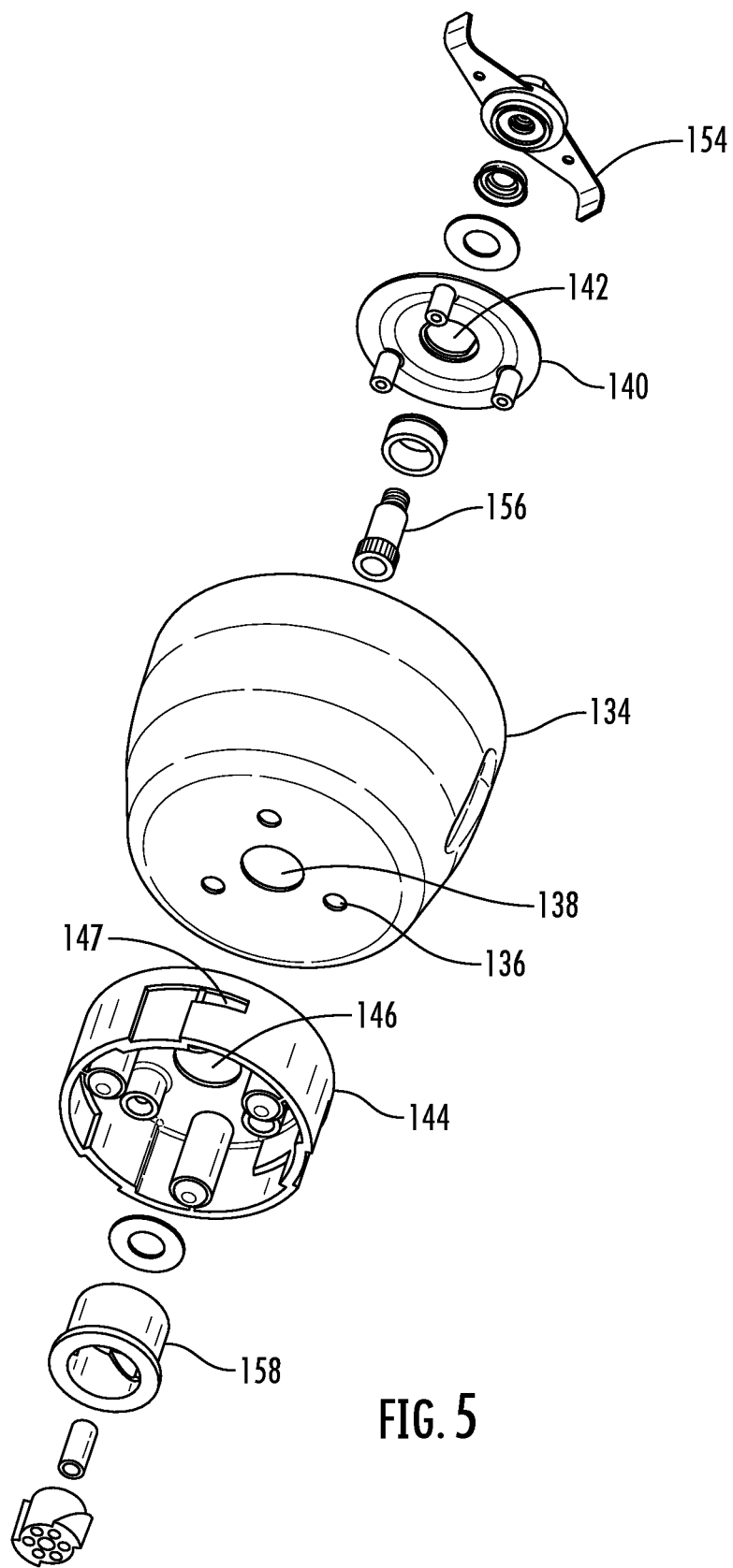
FIG. 5 is an exploded perspective view of the blade chamber and blades of the grinding device of FIG. 1.
Figure 6:
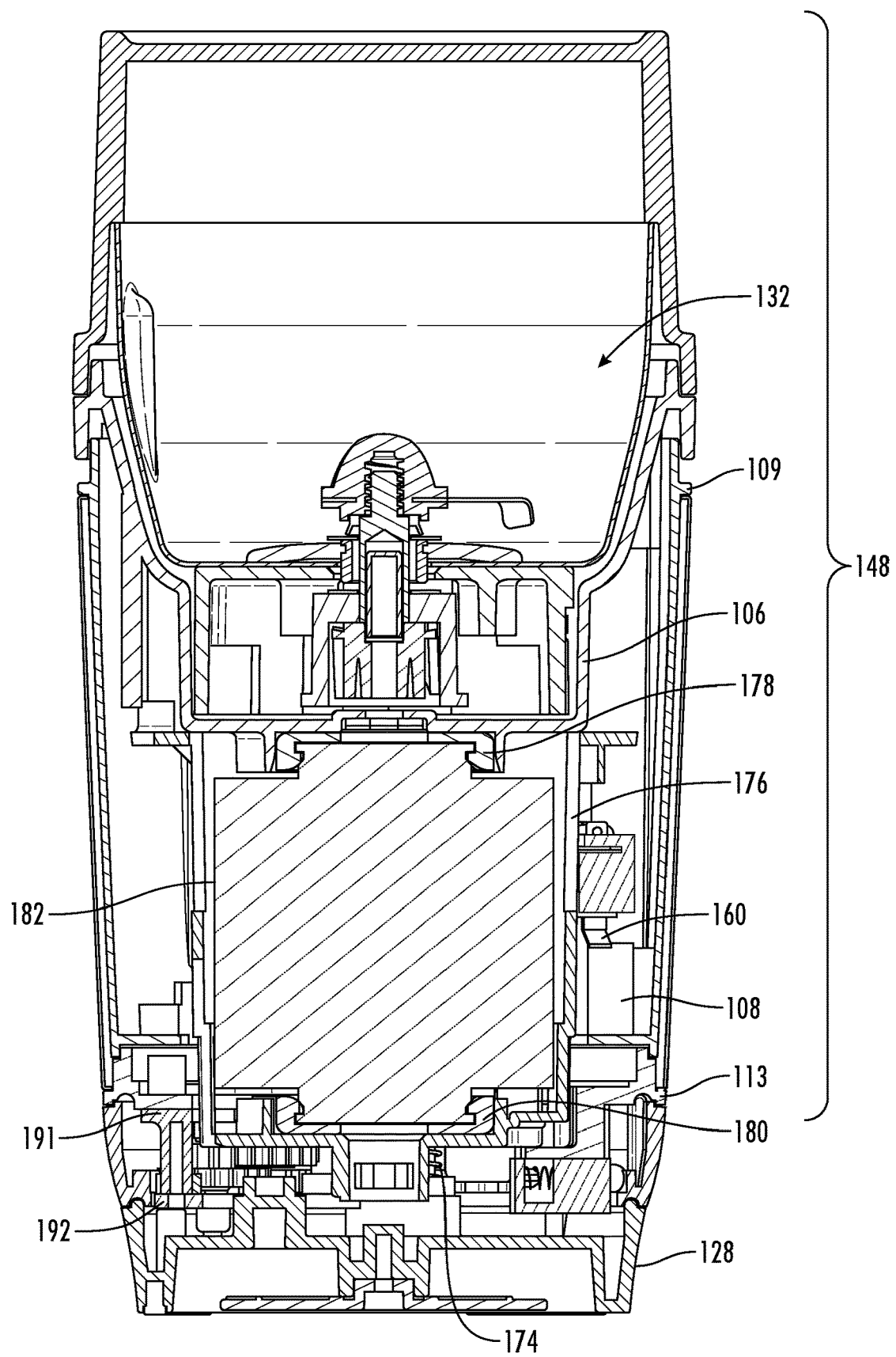
FIG. 6 is a side section view of the grinding device according to FIG. 1, wherein the moveable unit is in the raised position.

FIG. 5 illustrates the components operatively connecting the grinding bowl 134, a blade 154, and a motor 182 (see FIG. 6). The grinding bowl 134 has three grinding bowl support holes 136 and a rotor hole 138 extending vertically thought its bottom surface. An upper grinding bowl support 140 and a lower grinding bowl support 144 are coupled through the grinding bowl support holes 136 and thereby provide a stable connection between the grinding bowl 134 and the housing 104 (see FIG. 1). The upper and lower grinding bowl supports 140, 144 are configured to provide a seal between the interior of the grinding bowl 134 and the interior of the housing 104.

The upper grinding bowl support 140 is configured with a rotor hole 142 extending vertically through its center. The lower grinding bowl support 144 is configured with a rotor hole 146 extending vertically through its center and three slots 147 spaced equidistantly around its outside perimeter.

The slots 147 connect the lower grinding bowl support 144 to the grinding bowl housing 106 (see FIG. 2) by mating with three flanges (not shown) on the interior of the grinding bowl housing 106.

The motor 182 is operatively connected to and configured to rotate the blade 154 through a rotor system. A blade rotor 156 feeds through the rotor holes 138, 142, 146. The top end of the blade rotor 156 is fixed to the blade 154 and the lower end of the blade rotor 156 connects to a motor rotor 158. When the motor 182 is active, it rotates the motor rotor 158 on the vertical axis A, which in turn rotates the blade rotor 156 and the blade 154.

Figure 8:
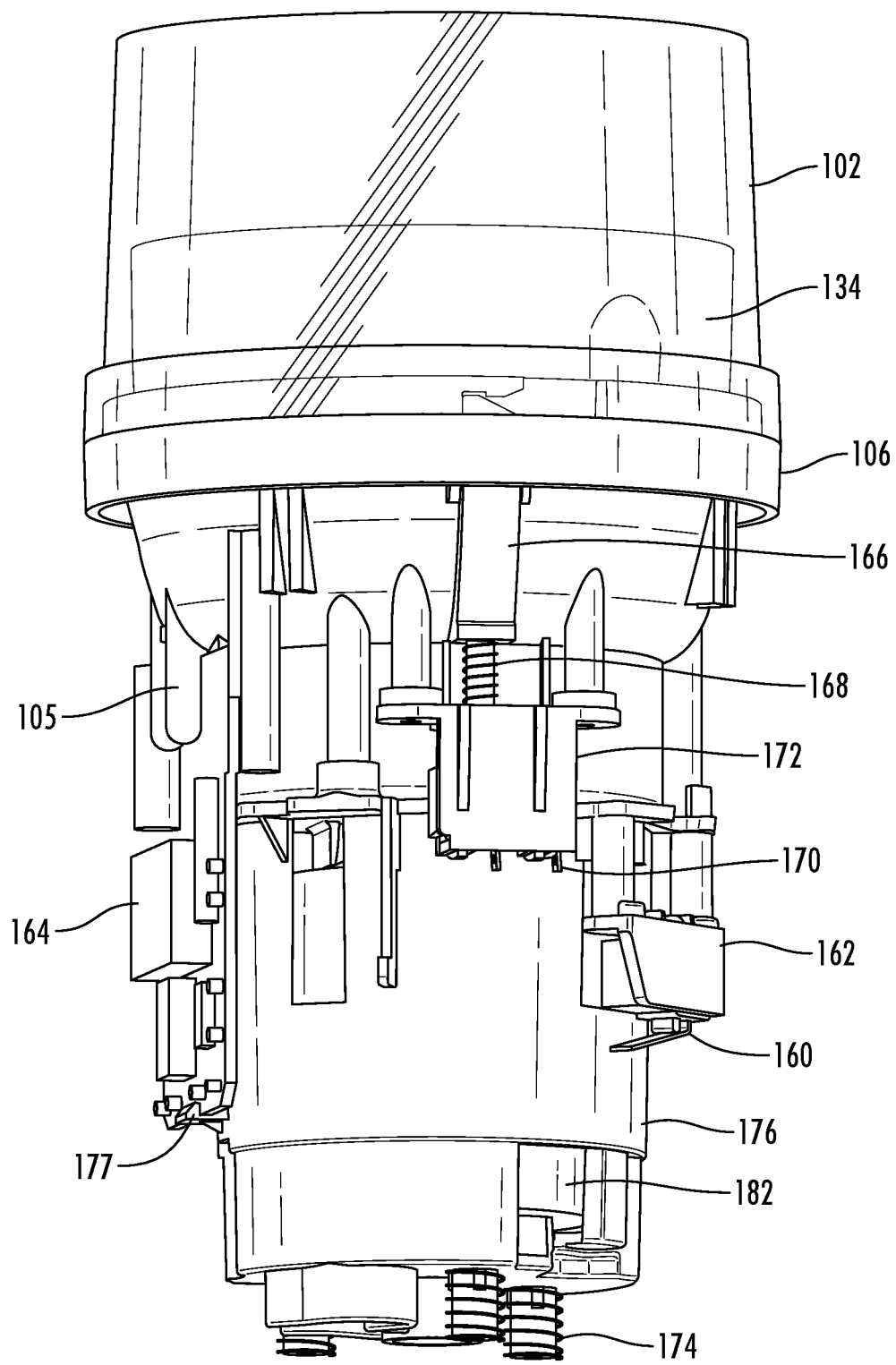
FIG. 8 is a perspective side view of the moveable unit of the grinding device according to FIG. 1.

As can be seen in FIG. 8, the grinding bowl housing 106 connects to a motor housing 176; additionally, the grinding bowl housing 106 has attached to its external surface a circuit board 164, a deactivation plunger 166, a deactivation plunger spring 168, a deactivation switch 170, and a deactivation switch housing 172. Similarly, the motor housing 176 has a moveable unit switch 160, a moveable unit switch housing 162, the circuit board 164, and three moveable unit springs 174 attached to its external surface. On its lower end, the circuit board 164 is mounted to a flange 177 protruding radially outwardly from the motor housing 176. On its upper end, the circuit board 164 is mounted between the main body of the grinding bowl housing 106 and two prongs 105 extending downwardly from the grinding bowl housing 106.

Internally, as can be seen in FIG. 6, the base of the motor housing 176 mates with a lower motor mount 180. Similarly, an upper motor mount 178 mates with the bottom of the grinding bowl housing 106. The motor 182 is mounted within the motor housing 176 and is captured between the upper and lower motor mounts 178, 180.

FIGS. 5 and 8 illustrate the components which together define a moveable unit 148. In this embodiment the moveable unit 148 comprises: the cover 102, the grinding bowl housing 106, the grinding bowl 134, the blade 154, the blade rotor 156, the motor rotor 158, the upper grinding bowl support 140, the lower grinding bowl support 144, the motor housing 176, the motor 182, the deactivation plunger 166, the deactivation plunger spring 168, the deactivation switch 170, the deactivation switch housing 172, the moveable unit switch 160, the moveable unit switch housing 162, the circuit board 164, the moveable unit springs 174, the upper motor mount 178 (see FIG. 4), and the lower motor mount 180 (see FIG. 4). The moveable unit 148 is able to move vertically relative to the remainder of the grinding device 100.

Figure 7:
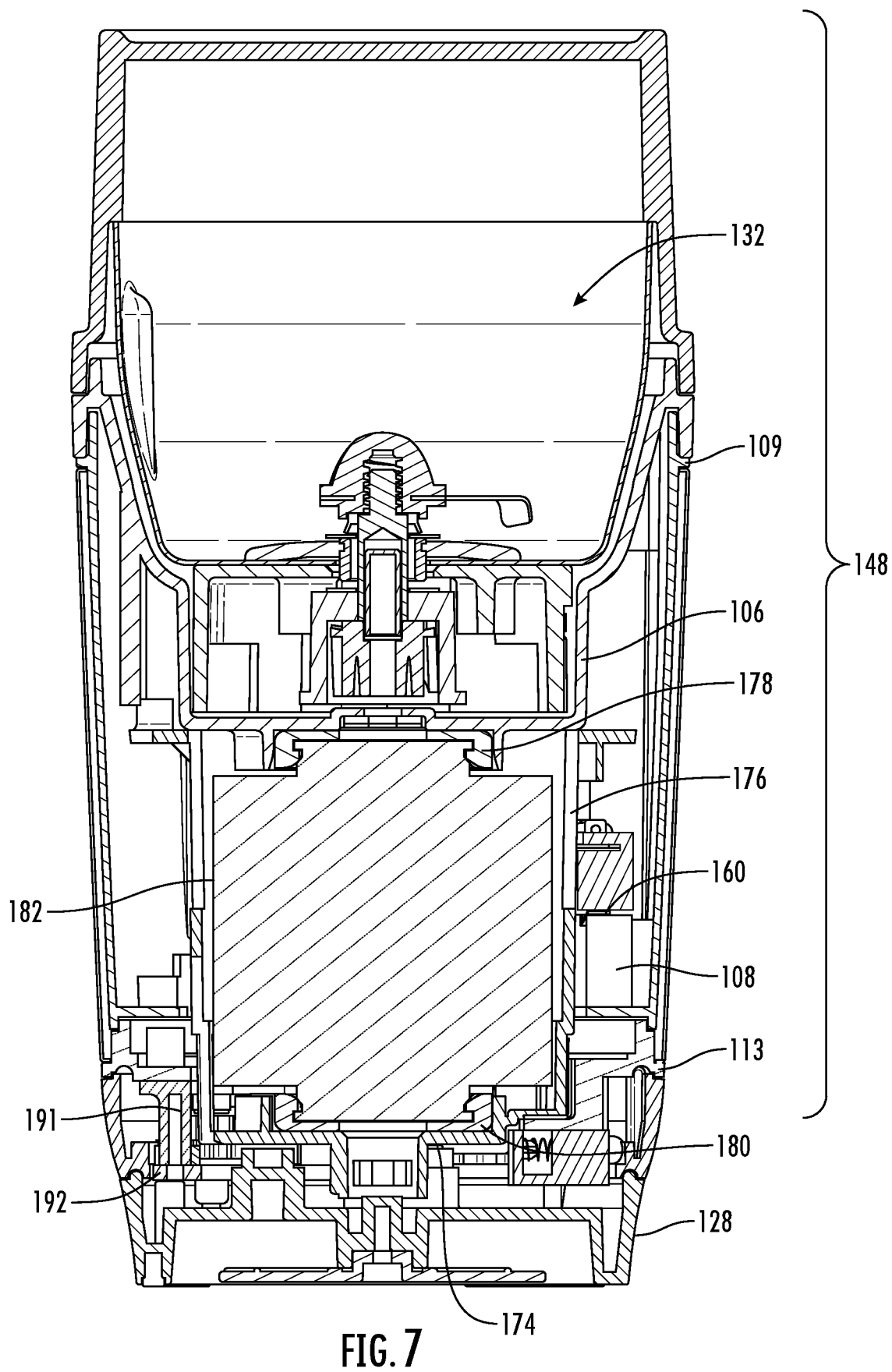
FIG. 7 is a side section view of the grinding device according to FIG. 6, wherein the movable unit is in the depressed position.

FIGS. 6 and 7 illustrate the vertical motion of the moveable unit 148. FIG. 6 illustrates the moveable unit 148 in the raised position, in which the moveable unit 148 is elevated (i.e., is farther from the base 128 of the housing 104). FIG. 7 illustrates the moveable unit 148 in the depressed position, in which the moveable unit 148 is lowered (i.e., closer to the base 128 of the housing 104). The moveable unit springs 174 are configured to compress against the top of the base 128 when the moveable unit 148 is depressed by the user. When the user releases the moveable unit 148, the moveable unit springs 174 urge the moveable unit 148 back into the raised position.

The circuit board 164 (e.g., the control unit), as seen in FIG. 8, is configured to control the operation and operational parameters of the motor 182. The circuit board 164 is configured to only activate the motor 182 when the cover 102 is properly attached to the grinding bowl housing 106 and, simultaneously, the moveable unit 148 is moved from the raised position to the depressed position. If either of the aforementioned conditions are not met, the circuit board 164 does not activate the motor 182. Additionally, if the cover 102 is removed while the motor 182 is operating, the circuit board 164 is configured to immediately deactivate the motor 182.

The moveable unit switch 160 is operatively connected with the motor 182 and configured such that it is actuated when the moveable unit 148 is in the depressed position (FIG. 7) and not actuated when the moveable unit 148 is in the raised position (FIG. 6). When the moveable unit switch 160 is not actuated, it is configured to send no signal to the circuit board 164. When the moveable unit switch 160 is actuated, it is configured to send a single, non-continuous "motor on" signal to the circuit board 164. If the cover 102 is properly attached to the grinding bowl housing 106, the motor 182 begins to operate. The motor 182 continues to operate for a set length of time unless the cover 102 is removed. In some embodiments, the motor 182 will shut off if the moveable unit 148 is moved from the raised position to the depressed position, thereby depressing the moveable unit switch 160, while the motor 182 is operating.

Figure 9:
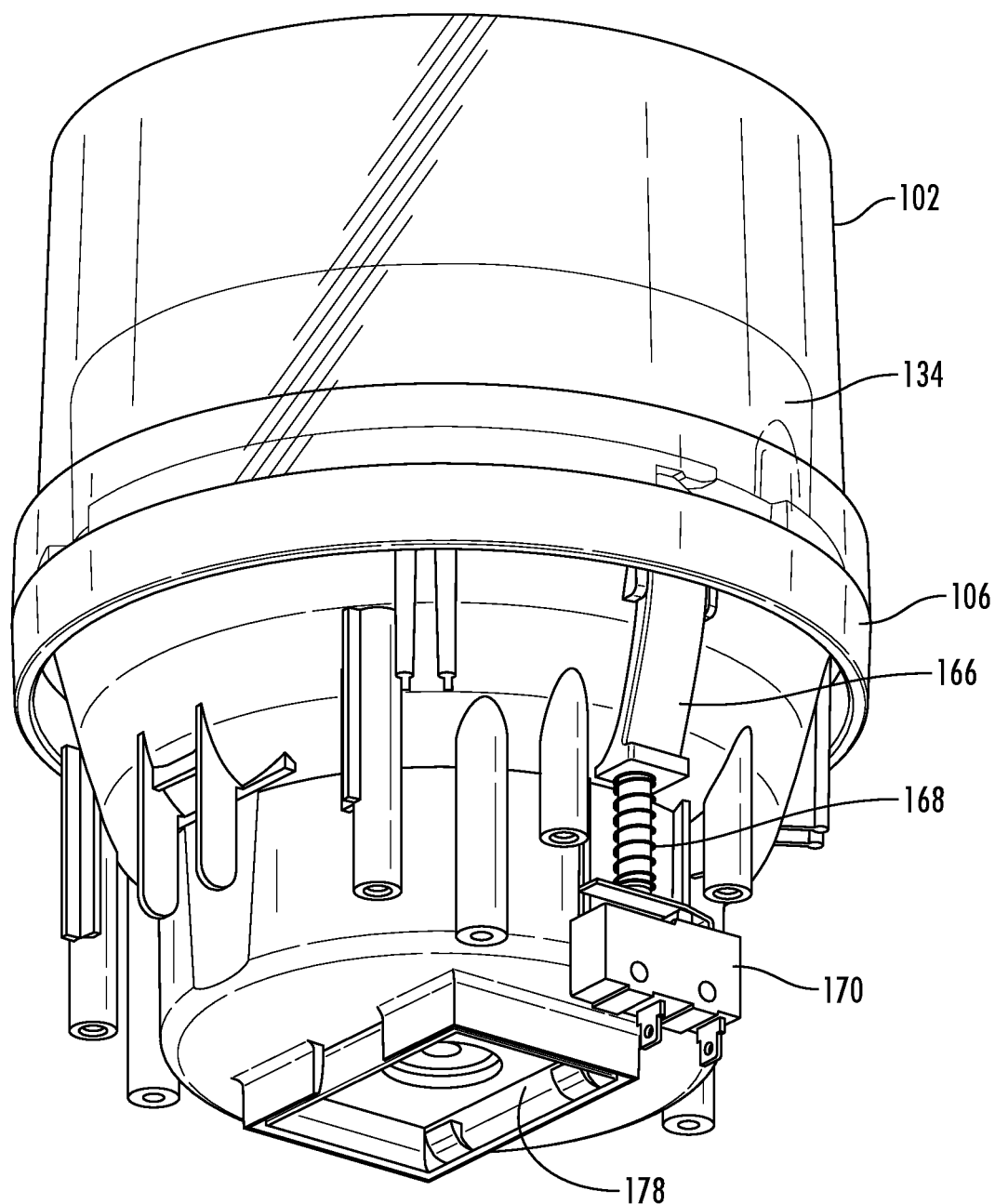
FIG. 9 is a perspective bottom view of the deactivation switch of the grinding device according to FIG. 1.

FIGS. 8 and 9 illustrate the components configured to disengage the motor 182 in the event that the cover 102 is not covering the grinding bowl 134. When the cover 102 is properly attached to the grinding bowl housing 106, the deactivation plunger 166 is depressed, which actuates the deactivation switch 170. The deactivation switch 170 is operatively connected to the motor 182 via the circuit board 164. When the deactivation switch 170 is actuated, it is configured to provide electrical power to the circuit board 164. Inversely, when the cover 102 is removed or is not properly attached to the grinding bowl housing 106, the deactivation plunger 166 is pushed vertically upwards by the deactivation plunger spring 168, which causes the deactivation plunger 166 to disengage from the deactivation switch 170. When the deactivation switch 170 is not actuated, no electrical power is sent to the circuit board 164 and, therefore, the motor 182 is incapable of operating.

The deactivation of the motor 182 when the cover 102 is not properly attached to the grinding bowl housing 106 can be an important safety feature. When the cover 102 is properly attached to the grinding bowl housing 106, the grinding chamber 132 is closed and there is no potential for harm to the user. Without this feature, the user may initiate the grinding process without the cover 102 in place or they may inadvertently remove the cover 102 while the motor 182 is operating. In such instances, there would be no barrier between the rotating blade 154 and the user and thus nothing to prevent accidental harm to the user. The inclusion of the deactivation switch 170 can help to prevent such harm from occurring.

Figure 10:
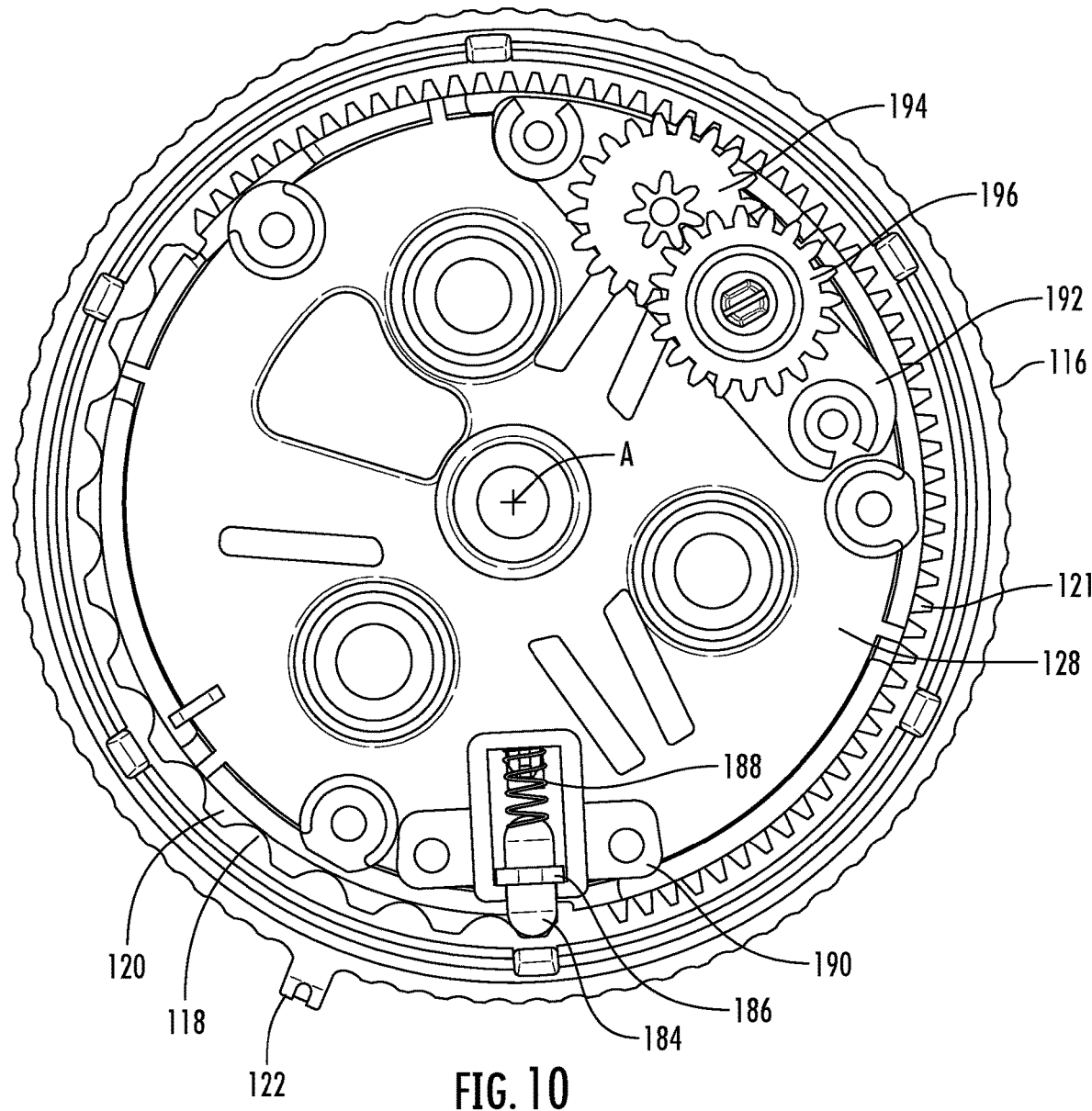
FIG. 10 is a top section view of the dial of the grinding device according to FIG. 1, wherein the dial plunger is in a setting position.
Figure 11:
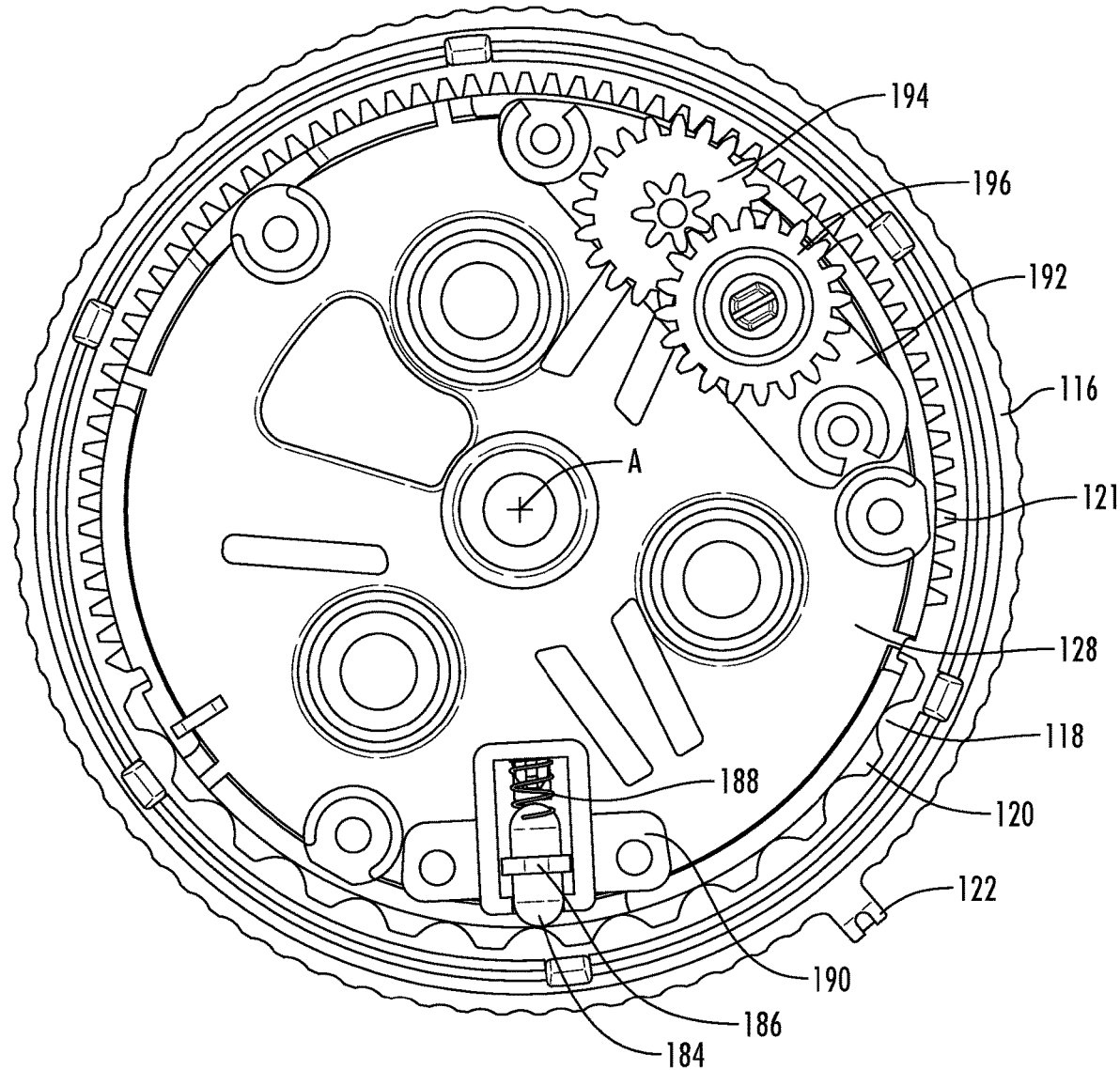
FIG. 11 is a top section view of the dial of the grinding device according to FIG. 10, wherein the dial plunger is between two setting positions.

FIGS. 10 and 11 illustrate the operation of a dial plunger 184, a first and second gears 194, 196, and the rotation of the dial 116. The dial plunger 184 is a cylinder with hemispherical ends and a circular ridge 186 around its center. The dial plunger 184 is mounted within the housing 104, partly within a mount 190 and partly extending radially outwardly from the mount 190 toward the dial 116. The mount 190 is connected to the upper dial support 112 (see FIG. 4). The circular ridge 186 on the dial plunger 184 prevents the dial plunger 184 from disengaging from the mount 190. A spring 188 is connected on one end to the back wall of the mount 190 and on the other end to the dial plunger 184. In this configuration, the spring 188 urges the dial plunger 184 radially outwardly toward the dial 116.

The dial 116 is configured with multiple semicircular protrusions 118 on a portion of the circumference of its interior perimeter. Between each of the semicircular protrusions 118 are bowl-like indentations 120. When the dial 116 is rotated to an operational parameter setting, the exterior end of the dial plunger 184 mates with a bowl-like indentation 120. When the dial 116 is left in a position between operational parameters, as shown in FIG. 11, the spring 188 urges the dial plunger 184 radially outward, which urges the dial 116 to rotate to the nearest setting. This effect is aided by the round edges of the dial plunger 184 and the semi-circular protrusions 118, which are configured to provide minimal frictional force. When rotating the dial 116, the dial plunger 184 provides tactile feedback to the user (and perhaps audible noise) when the dial plunger 184 moves into a bowl-like indentation 120.

Figure 3:
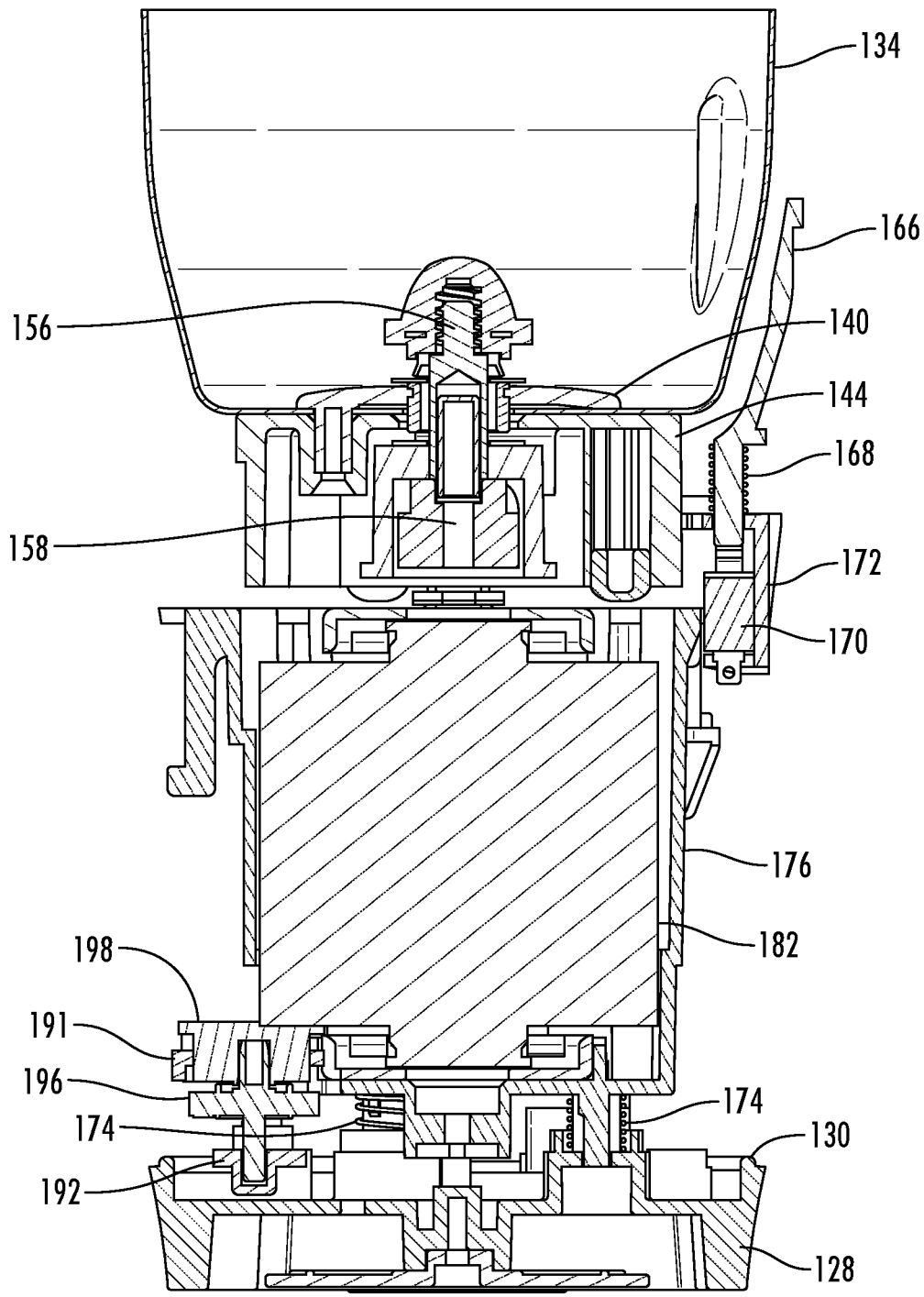
FIG. 3 is a side section view of the grinding device according to FIG. 1.

An upper gear mount 191, as seen in FIG. 7, is connected to and suspended from the bottom of the upper dial support 112. A lower gear mount 192 is connected to and suspended from the upper gear mount 191. A gear system comprising the first and second gears 194, 196 is mounted between the upper and lower gear mounts 191, 192. As seen in FIG. 3, a potentiometer 198 is mounted to the top of the upper gear mount 191 and extends partly through it. The second gear 196 is operatively connected to the bottom of the potentiometer 198.

The dial 116 is configured to control at least one operational parameter of the motor 182 through its operative connection to the first and second gears 194, 196 and thereby the potentiometer 198. The dial 116 is configured with multiple gear teeth 121 on the portion of the circumference of its interior perimeter not containing the semicircular protrusions 118 or bowl-like indentations 120. When the user rotates the dial 116, the gear teeth 121 are configured to rotate the first gear 194 which rotation turns the second gear 196. The potentiometer 198 is configured to detect the degree of rotation of the second gear 196. The circuit board 164 is configured to measure the resistance of the potentiometer and use the measured value to identify the operational parameter to which the dial 116 is set.

The dial 116 is configured to modify the operation of the grinding device 100. The dial 116 and/or housing 104 are configured with indicia (not shown) which communicate the various dial 116 settings to the user. The indicia communicate the settings in terms of the desired level of ground coarseness and the quantity of beans in the grinding chamber 132. At the lowest dial 116 setting, relative to the other dial 116 settings, the motor 182 will run for the shortest period of time. Relative to the other dial 116 settings, this setting is to be used for the smallest quantity of beans in the grinding chamber 132 and when the user desires the coffee bean grounds to be coarse. At the highest dial 116 setting, relative to the other dial 116 settings, the motor 182 will run for the longest period of time. Relative to the other dial 116 settings, this setting is to be used for the largest quantity of beans in the grinding chamber 132 and when the user desires the coffee bean grounds to be fine.

The grinding device 100 and similar devices are primarily used early in the morning and in situations where the user desires additional caffeine stimulation. Under such circumstances, simplicity of user input is of heightened importance.

Operation of the dial 116 and the moveable unit 148 is designed to be simple and intuitive. The dial 116 indicia reduce two parameters (coarseness and quantity of coffee beans) to a single spectrum, thereby reducing required user input to a single variable. Once a setting is chosen, the grinding device 100 only requires the user to indicate when to begin operation by depressing the moveable unit 148 a single time.

In some prior art grinding devices, the device is configured to cease operation when the user is no longer interacting with it. In contrast, the grinding device 100 of the present invention is configured so that once the user depresses the moveable unit 148, the grinding device 100 requires no additional user input. This can be beneficial because the user can leave the grinding device 100 to operate while they perform other tasks.

The moveable unit 148 may reduce the quantity of necessary external protrusions, giving the outer profile of the device a sleek cylinder-like appearance. The design is aesthetically pleasing and may reduce the counter space a user needs to dedicate to the device. Additionally, reducing the size of the outer profile may decrease transportation costs due to the corresponding reduction in packaging size.

Those of skill in this art will appreciate that the housing 104 may take different forms and may have different configurations. For example, the inner shell 108 and the outer shell 110 may be a single component. Similarly, the upper dial support 112 may be a part of the inner shell 108, the outer shell 110, or the component consisting of them both. The grinding bowl 134 and grinding bowl housing 106 may be a single component. Moreover, the cover 102 may mate with the grinding bowl 134 directly instead of to the grinding bowl housing 106. The grinding bowl housing 106 may also be configured such that no part of it is contained partially within the inner shell 108.

The exterior surface of any of the components of the housing 104 may not be smooth and may have various aesthetic features added. For example, a brand name or logo may be drawn, etched, engraved, etc. on the top of the cover 102 or on the outer perimeter of the outer shell 110.

Additionally, the housing 104 can easily be configured so that the dial 116 also serves as a base for the grinding device. In such a configuration the circular ridge 124 on the top of the dial 116 and the circular groove 114 on the bottom of the upper dial support 112 would be designed so as to prevent vertical motion of the dial 116. This can be achieved in any number of ways; for example, both the circular ridge 124 on the top of the dial 116 and the circular groove 114 on the bottom of the upper dial support 112 may have interlocking lips that snap into place during assembly.

The dial 116 may also be located above the inner and outer shells 108, 110. In such a configuration, the upper dial support 112 may be moved to connect to the bottom of the grinding bowl housing 106 or the bottom of the grinding bowl housing 106 may incorporate the circular groove 114 and connect to the dial 116 directly. Further, it is contemplated that the dial 116 may be configured without the tab 122 or with a smooth exterior surface.

The various features limiting the motion of the outer shell 110 may be modified. For example, the inner shell groove 115 and outer shell ridge 111, which mate to prevent the outer shell 110 from rotating, may be significantly shorter instead of extending the entire height of the inner and outer shells 108, 110. In such a configuration, the inner shell groove 115 and outer shell ridge 111 may be configured such that they also prevent vertical motion of the outer shell 110 relative to the inner shell 108 in at least one direction. Such a configuration may make the circular inner shell lip 109 or the circular upper dial support lip 113 unnecessary or extraneous.

Internal support components may also be combined with each other or with various parts of the housing 104. For example, the lower grinding bowl support 144 may be configured to be part of the grinding bowl housing 106 or part of the inner shell 108. Similarly, the lower gear mount 192 may be configured to be part of the base 128 and the upper gear mount 191 may be configured to be part of the upper dial support 112.

The number of moveable unit springs 174 may be increased or decreased as desired for altered functionality. The same is true for the number of gears between the dial 116 and the potentiometer 198.

It may be appreciated that the moveable unit 148 may comprise of any number of parts in different configurations. For example, the moveable unit switch 160 may remain static by being connected to the inner shell 108 and configured to be actuated by a part of the moveable unit 148 when the movable unit 148 descends.

In one embodiment, the moveable unit 148 may comprise only the grinding chamber 134, the upper and lower grinding bowl supports 140, 144, the deactivation plunger 166, the deactivation plunger spring 168, the deactivation switch 170, and the deactivation switch housing 172. In such a configuration, the blade 154 remains static. The blade rotor 156 may be of such a length to allow the moveable unit 148 to move vertically along it without contacting the motor 182. The motor housing 176 may be connected to the interior wall of the inner shell 108 or to the base 128.

It may be further appreciated that the moveable unit 148 may stay depressed while the motor 182 is in operation. In some embodiments, a spring-operated plunger (not shown) may grip the moveable unit 148 until a release signal is send from the circuit board 164 indicating that the desired grinding time has been achieved. In such a configuration, the "motor on" signal from the moveable unit switch 160 to the circuit board 164 may be continuous while the moveable unit switch 160 is actuated.

In other embodiments, the user may hold the moveable unit 148 in the depressed position for the desired grinding time. In such a configuration, the moveable unit switch 160 may be configured to send a continuous "motor on" signal to the circuit board 164 while the moveable unit 148 remains in the depressed position. The motor 182 may be configured to operate as long as the circuit board 164 continues to receive the "motor on" signal from the moveable unit switch 160 up to a maximum grinding time. In some embodiments the maximum grinding time is 45 seconds.

The deactivation switch 170 may be configured to send a continuous "motor on" signal to the circuit board 164. In such an embodiment, the circuit board 164 may receive a supply of electrical power independent of its connection to the deactivation switch 170. The circuit board 164 may be further configured to only operate while receiving the "motor on" signal from the deactivation switch 170 and simultaneously receiving either a single non-continuous "motor on" signal or a continuous "motor on" signal from the moveable unit switch 160. Inversely, when the deactivation switch 170 is not actuated, it may be configured to cease sending a "motor on" signal to the circuit board 164, which may be configured to deactivate the motor 182 when not receiving the continuous "motor on" signal from the deactivation switch 170.

In some embodiments, the dial plunger 184 may be configured so as to not make audible noise when the dial 116 is rotated.

Additionally, the motor 182 may be configured to vary blade speed or even reduce the blade speed to zero during operation before increasing the speed again. This "pulse" effect can help prevent clumps of grounds from forming and can ensure a more even grind. The dial plunger 184 may be configured to modify any operational parameter of the motor including grinding duration, blade rotation speed, pulse frequency, pulse pattern, etc.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A grinding device comprising:
a housing that includes a sidewall;
a grinding bowl within the housing;
a cover that mates with one of the housing and the grinding bowl, wherein the cover together with the grinding bowl defines a grinding chamber;
a blade positioned within the grinding chamber;
a motor, positioned within the housing, operatively connected with and configured to rotate the blade;
a dial radially aligned with the sidewall of the housing, wherein the dial is configured to control at least one operational parameter of the motor; and
wherein the dial rotates around a vertical axis.

2. The grinding device of claim 1, further comprising a control unit, wherein the control unit is connected to the dial and the motor.

3. The grinding device of claim 1, wherein the at least one operational parameter comprises at least two operational parameters, and wherein the dial is configured to provide physical and/or auditory feedback to a user to indicate that the dial has rotated from one operational parameter to another operational parameter of the at least two operational parameters.

4. The grinding device of claim 3, further comprising a spring-operated plunger mounted within the housing that engages the dial.

5. The grinding device of claim 1, further comprising a deactivation feature that disengages the motor when the cover is not mated with one of the housing and the grinding bowl.

6. The grinding device of claim 5, wherein the deactivation feature is a switch operatively connected with the motor and configured to actuate when the cover is mated with one of the housing and the grinding bowl.

7. The grinding device of claim 1, wherein the operational parameter being controlled by the dial is a grinding duration.

8. The grinding device of claim 1, wherein the operational parameter being controlled by the dial is a blade rotation speed.

9. The grinding device of claim 1, wherein the dial and the housing are configured with external indicia to indicate the at least one operational parameter of the motor.

10. The grinding device of claim 9, wherein the indicia indicate a number of cups of beans in the grinding chamber and a desired coarseness.

11. The grinding device of claim 1, wherein at least the grinding chamber defines a moveable unit, and wherein the moveable unit is configured to move vertically between (a) a depressed position, in which the moveable unit is closer to a base of the housing, and (b) a raised position, in which the moveable unit is farther from the base of the housing.

12. The grinding device of claim 11, further comprising a switch, wherein the switch is operatively connected with the motor, wherein the movement of the moveable unit actuates the switch to operate the motor.

\* \* \* \* \*